(12) United States Patent
Ledford

(10) Patent No.: US 7,954,943 B2
(45) Date of Patent: Jun. 7, 2011

(54) EYEGLASSES HOLDER

(76) Inventor: Clayton Wallace Ledford, Lincolnton, NC (US)

(*) Notice: Subject to any disclaimer, the term of this patent is extended or adjusted under 35 U.S.C. 154(b) by 0 days.

(21) Appl. No.: 12/818,213

(22) Filed: Jun. 18, 2010

(65) Prior Publication Data
US 2011/0019147 A1   Jan. 27, 2011

Related U.S. Application Data

(63) Continuation-in-part of application No. 29/353,975, filed on Jan. 18, 2010, now Pat. No. Des. 619,360.

(60) Provisional application No. 61/271,576, filed on Jul. 23, 2009.

(51) Int. Cl.
G02C 3/02   (2006.01)

(52) U.S. Cl. ............ 351/155; 24/3.12; D3/265

(58) Field of Classification Search .......... 351/155, 351/158, 41; 24/3.3, 3.11, 3.12, 336; 2/10; D3/265, 266
See application file for complete search history.

(56) References Cited

U.S. PATENT DOCUMENTS

| | | | |
|---|---|---|---|
| D231,947 S | 6/1974 | Weber | |
| D306,739 S | 3/1990 | Mackiewich | |
| D306,868 S | 3/1990 | Manuel | |
| D316,484 S | 4/1991 | Kounis et al. | |
| 5,046,696 A | 9/1991 | Lee | |
| D321,199 S | 10/1991 | Souisa et al. | |
| 5,056,668 A | 10/1991 | Berger | |
| 5,082,225 A | 1/1992 | Nespoli | |
| D327,285 S | 6/1992 | Arnouts | |
| 5,119,979 A | 6/1992 | Kallman | |
| 5,653,414 A | 8/1997 | Chimel | |
| 5,829,103 A * | 11/1998 | Allen | 24/11 R |
| 5,867,874 A * | 2/1999 | Simpson | 24/336 |
| D423,777 S | 5/2000 | Folisi | |
| 6,206,258 B1 | 3/2001 | Calder | |
| 6,481,059 B2 * | 11/2002 | Morris | 24/3.12 |
| D471,709 S | 3/2003 | Coyne | |
| D478,630 S | 8/2003 | Riggins | |
| D610,805 S | 3/2010 | Ledford | |
| D619,360 S | 7/2010 | Ledford | |

* cited by examiner

Primary Examiner — Hung X Dang
(74) Attorney, Agent, or Firm — Olive Law Group, PLLC

(57) ABSTRACT

An eyeglasses holder for holding eyeglasses proximal a wearer's cap is provided. The holder includes a longitudinally extending first retaining member and a longitudinally extending second retaining member spaced-apart from the first member and being interconnected on respective first ends thereof by a laterally extending base member. A longitudinally extending intermediate retaining member is positioned between the first and second members and defines a cap engaging void between the first member and an eyeglasses engaging void between the second member.

10 Claims, 4 Drawing Sheets

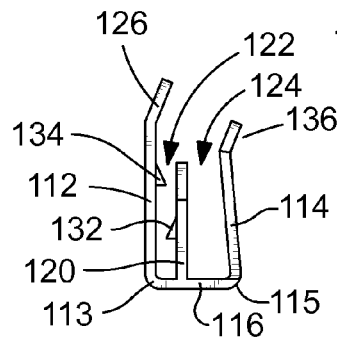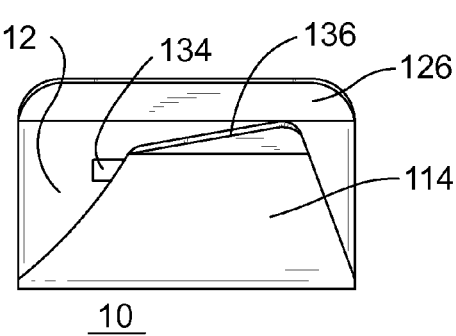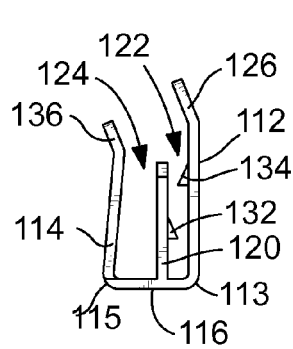
FIG. 7　　　FIG. 6　　　FIG. 8
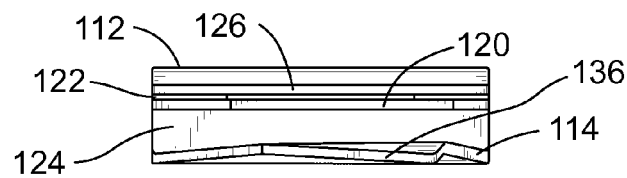
FIG. 9
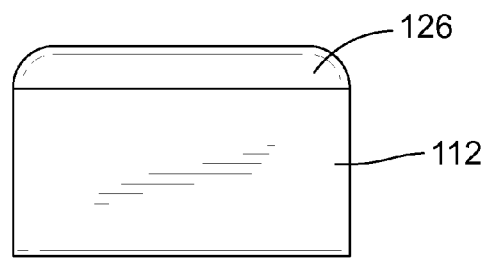
FIG. 10

US 7,954,943 B2

EYEGLASSES HOLDER

PRIORITY CLAIM

This application claims priority to U.S. Provisional Patent Application No. 61/271,576, filed on Jul. 23, 2009, and U.S. Design Pat. application No. 29/353,975, filed on Jan. 18, 2010, now U.S. Pat. No. D 619,360.

TECHNICAL FIELD AND BACKGROUND OF THE INVENTION

This application is directed towards an eyeglasses holder, and more particularly towards an eyeglasses holder for being attached to the cap of a wearer.

Traditional methods of providing convenient placement of eyeglasses near a wearer's cap have suffered from various drawbacks. Some devices were bulky or expensive to make. Other devices were aesthetically unpleasing. Other devices offered little versatility. Accordingly, a need exists for an eyeglasses holder that solves the problems associated with the prior art.

SUMMARY OF THE INVENTION

It is an object of the invention to provide an eyeglasses holder that is aesthetically pleasing.

It is another object of the invention to provide an eyeglasses holder that is versatile and can fit many types of hats or similar articles of clothing.

It is another object of the invention to provide an eyeglasses holder that is relatively cost efficient to manufacture.

These and other objects of the invention are achieved in the preferred embodiments disclosed below by providing an eyeglasses holder for holding eyeglasses proximal a wearer's cap. The holder includes a longitudinally extending first retaining member and a longitudinally extending second retaining member spaced-apart from the first member and being interconnected on respective first ends thereof by a laterally extending base member. A longitudinally extending intermediate retaining member is positioned between the first and second members and defines a cap engaging void between the first member and an eyeglasses engaging void between the second member.

According to another embodiment, the first member defines a flanged portion on a second end that extends towards the cap engaging void for engaging the cap.

According to another embodiment, the second member defines an arcuate second end.

According to another embodiment, the second member defines a tapered second end.

According to another embodiment, the intermediate member further includes a barb extending towards the cap engaging void.

According to another embodiment, the first member further includes a barb extending towards the cap engaging void.

According to another embodiment, a lateral dimension of the cap engaging void is smaller than a lateral dimension of the eyeglasses engaging void.

According to another embodiment, the first member extends longitudinally beyond the second member.

According to another embodiment, the second member extends longitudinally beyond the intermediate member.

According to another embodiment, the second member defines a surface area that is larger than a surface area of the intermediate member and the second member is positioned relative to the intermediate member so as to restrict viewing of the intermediate member.

BRIEF DESCRIPTION OF THE DRAWINGS

Some of the objects of the invention have been set forth above. Other objects and advantages of the invention will appear as the invention proceeds when taken in conjunction with the following drawings, in which:

FIG. 6 is a front view of the eyeglasses holder of FIG. 5 according to one or more embodiments of the present invention;

FIG. 7 is a left side view of the eyeglasses holder of FIG. 5 according to one or more embodiments of the present invention;

FIG. 8 is a right side view of the eyeglasses holder of FIG. 5 according to one or more embodiments of the present invention;

FIG. 9 is a top view of the eyeglasses holder of FIG. 5 according to one or more embodiments of the present invention; and FIG. 10 is a rear view of the eyeglasses holder of FIG. 5 according to one or more embodiments of the present invention;

DESCRIPTION OF THE PREFERRED EMBODIMENTS AND BEST MODE

Figure 1:
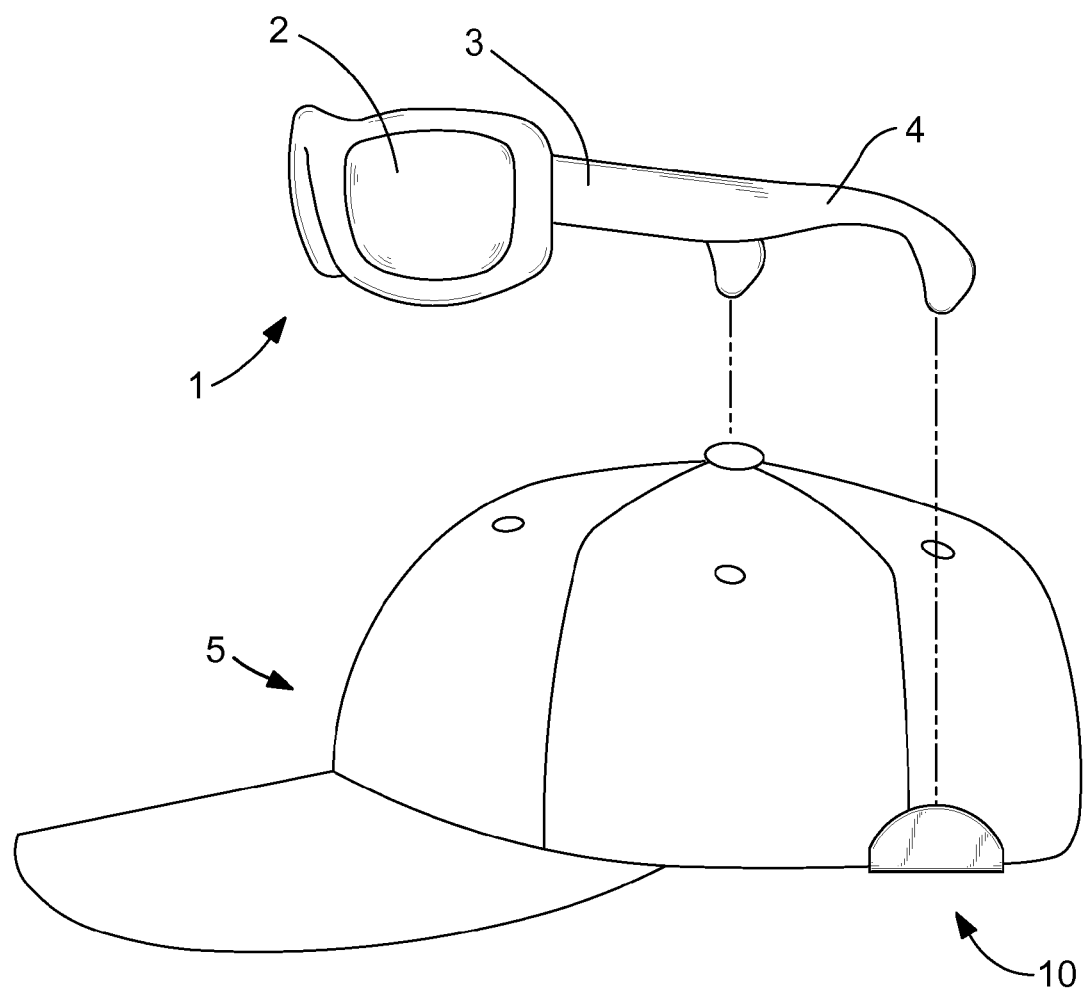
FIG. 1 is a perspective view of an eyeglasses holder installed upon a cap according to one or more embodiments of the present invention.

The presently disclosed subject matter now will be described more fully hereinafter with reference to the accompanying drawings, in which some, but not all embodiments are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

Referring now specifically to the drawings, an eyeglasses holder is shown throughout FIGS. 1 through 4 and is generally designated 10. The eyeglasses holder 10 is provided for holding eyeglasses 1 proximal a wearer's cap 5. The eyeglasses 5 may be any suitable type, but are illustrated as having lenses 2 carried by frame 3 having temple arms 4 for resting above the wearer's ears. The holder 10 is provided for engaging the wearer's cap 5 and also engaging the eyeglasses 1 so that the eyeglasses may be rested upon the cap 5 out of the wearer's line of sight.

Figure 2:
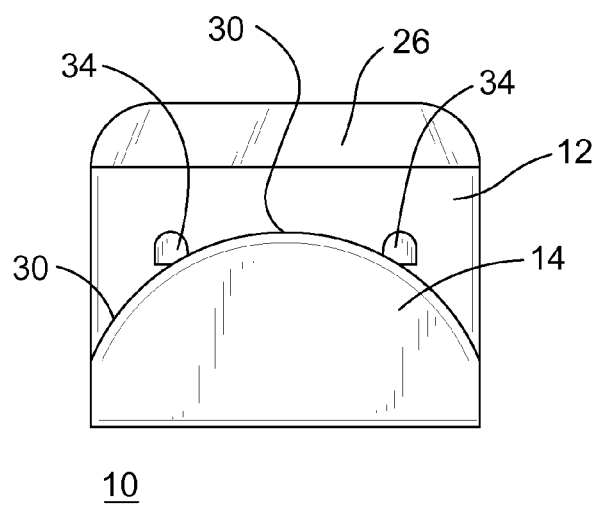
FIG. 2 is a front view of the eyeglasses holder of FIG. 1 according to one or more embodiments of the present invention.
Figure 3:
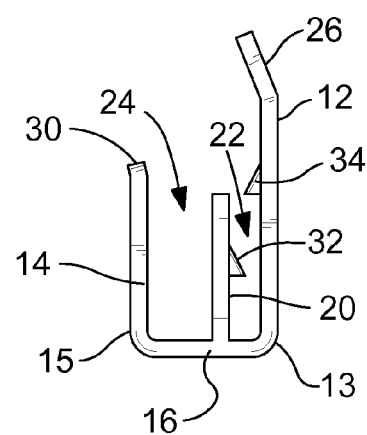
FIG. 3 is a side view of the eyeglasses holder of FIG. 1 according to one or more embodiments of the present invention.
Figure 4:
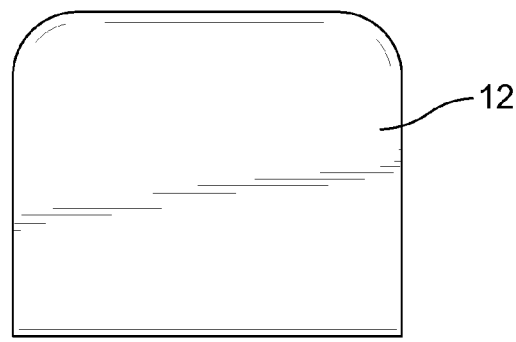
FIG. 4 is a rear view of the eyeglasses holder of FIG. 1 according to one or more embodiments of the present invention.
Figure 5:
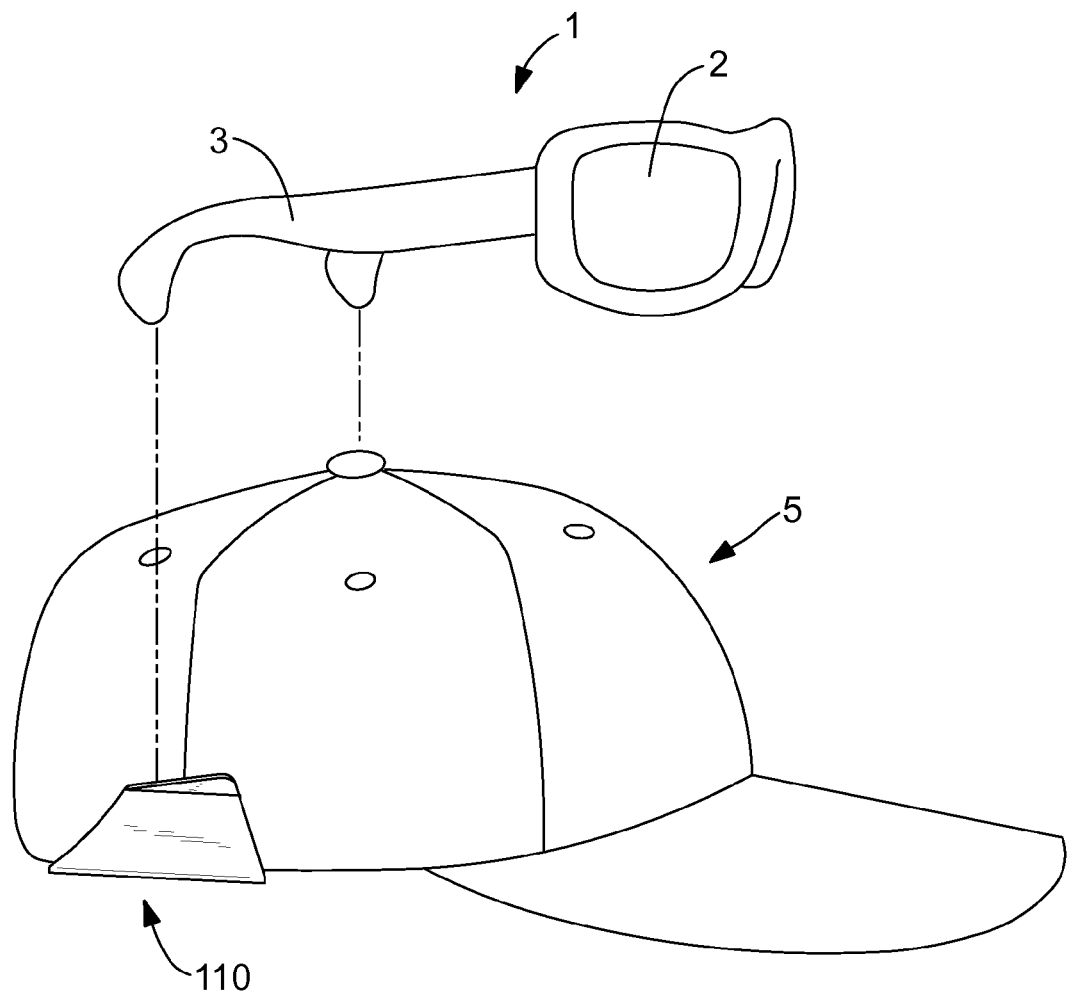
FIG. 5 is a perspective view of an eyeglasses holder installed upon a cap according to one or more embodiments of the present invention.

As illustrated in FIGS. 2 through 4, the holder 10 includes a longitudinally extending first retaining member 12 and a longitudinally extending second retaining member 14 that is spaced-apart from the first member 12. The first and second members, 12, 14 are interconnected on respective first ends 13, 15 by a laterally extending base member 16. A longitudinally extending intermediate retaining member 20 is positioned between the first member 12 and second member 14. A cap engaging void 22 is defined between the first member 12 and the intermediate member 20. The cap engaging void 22 is provided for receiving a portion of the cap 5 and being secured thereto as illustrated in FIG. 1. An eyeglasses engaging void 24 is also defined between the second member 14 and the intermediate member 20 for receiving the temple arms 4 of the eyeglasses 1.

The first member 12 may define a flanged portion 26 on a second end 27 thereof. The flanged portion 26 extends towards the cap engaging void 24 and provides an additional contact surface for engaging with an interior surface of the cap 5. The second member 14 may define an arcuate second end 30 which may be provided for improved aesthetics and ease of access into the eyeglasses engaging void 24. The arcuate second end 30 may also generally extend away from the eyeglasses engaging void 24.

The intermediate member 20 may further include at least one barb 32 extending towards the cap engaging void 22. The at least one barb 32 may have a circular, square, triangular, or oval shaped cross-section. The first member 12 may also include a barb 34 extending towards the cap engaging void 22. The barbs 32, 34 are provided for creating contact points onto the wearer's cap 5 to thereby further secure the holder 10.

As best illustrated in FIG. 3, a lateral dimension of the cap engaging void 22 is smaller than a lateral dimension of the eyeglasses engaging void 24. This provides sufficient space in each of the voids 22, 24 to house a cap 5 and eyeglasses 1, respectively, while maintaining a compact overall size for the holder 10. Also as best illustrated in FIG. 3, the first member 12 extends longitudinally beyond the second member 14. In this manner, additional surface area of the first member 12 is provided for engaging the cap 5, while minimal surface area of the second member 14 is viewable when the holder 10 is installed on cap 5. Additionally, the second member 14 extends longitudinally beyond the intermediate member 20. The second member 14 has a surface area that is larger than a surface area of the intermediate member 20. Additionally, the second member 14 is positioned relative to the intermediate member 20 in such a way that the intermediate member 20 is not viewable to others from a side view.

An alternate embodiment of an eyeglasses holder is illustrated in FIGS. 5 through 10 and is generally designated 110. The eyeglasses holder 110 shares many features as those described in regards to eyeglasses holder 10.

As illustrated in FIGS. 6 through 10, the holder 110 includes a longitudinally extending first retaining member 112 and a longitudinally extending second retaining member 114 that is spaced-apart from the first member 112. The first and second members, 112, 114 are interconnected on respective first ends 113, 115 by a laterally extending base member 116. A longitudinally extending intermediate retaining member 120 is positioned between the first member 112 and second member 114. A cap engaging void 122 is defined between the first member 112 and the intermediate member 120. The cap engaging void 122 is provided for receiving a portion of the cap 5 and being secured thereto as illustrated in FIG. 1. An eyeglasses engaging void 124 is also defined between the second member 114 and the intermediate member 120 for receiving the temple arms 4 of the eyeglasses 1.

The first member 112 may define a flanged portion 126 on a second end 127 thereof. The flanged portion 126 extends towards the cap engaging void 124 and provides an additional contact surface for engaging with an interior surface of the cap 5. The second member 114 may define a tapered second end 136 which may be provided for improved aesthetics and ease of access into the eyeglasses engaging void 124. The arcuate second end 130 may also generally extend away from the eyeglasses engaging void 124.

The intermediate member 120 may further include at least one barb 132 extending towards the cap engaging void 122. The at least one barb 132 may have a circular, square, triangular, or oval shaped cross-section. The first member 112 may also include an elongate barb 134 extending towards the cap engaging void 122. The barbs 132, 134 are provided for creating contact points onto the wearer's cap 5 to thereby further secure the holder 110.

As best illustrated in FIGS. 7 and 8, a lateral dimension of the cap engaging void 122 is smaller than a lateral dimension of the eyeglasses engaging void 124. This provides sufficient space in each of the voids 122, 124 to house a cap 5 and eyeglasses 1, respectively, while maintaining a compact overall size for the holder 110. Also as best illustrated in FIGS. 7 and 8, the first member 112 extends longitudinally beyond the second member 114. In this manner, additional surface area of the first member 112 is provided for engaging the cap 5, while minimal surface area of the second member 114 is viewable when the holder 110 is installed on cap 5. Additionally, the second member 114 extends longitudinally beyond the intermediate member 120. The second member 114 has a surface area that is larger than a surface area of the intermediate member 120. Additionally, the second member 114 is positioned relative to the intermediate member 120 in such a way that the intermediate member 120 is not viewable to others from a side view.

The eyeglasses holders 10, 110 may be made from a plastic injection molding process, or in some embodiments may be constructed of metal. Operation and use of the eyeglasses holders 10, 110 will be apparent when taken in conjunction with FIGS. 1 and 5. The eyeglasses holders 10, 110 are proximally positioned to the cap 5. The cap 5 is then slid down between the first member 12 and the intermediate member 20. Barbs 32 and 34 provide an interference contact with the cap 5. In some embodiments, the eyeglasses holder 10 or 110 may need to be bent outwardly so that a larger distance is defined in the cap engaging void 22 or 122 so that the cap 5 can be inserted therein. The eyeglasses holder 10 or 110 is then simply released such that an interference contact exists between surfaces barbs 32, 34 and the cap 5. Additionally, flanged portions 26 and 126 may provide additional interference contact with the cap 5.

Once the eyeglasses holder 10 or 110 is installed on the cap 5, the eyeglasses 1 are then positioned such that the temple arms 4 of the eyeglasses 5 may fit in the eyeglasses engaging void 24 or 124.

An eyeglasses holder is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

I claim:
1. An eyeglasses holder for holding eyeglasses proximal a wearer's cap, the holder comprising:
   a longitudinally extending first retaining member;
   a longitudinally extending second retaining member spaced-apart from the first member and being interconnected on respective first ends thereof by a laterally extending base member, the second retaining member defining a top planar surface that extends at an angle relative to the base member;

a longitudinally extending intermediate retaining member positioned between the first and second members and defining a cap engaging void with the first member, and an eyeglasses engaging void with the second member, the intermediate retaining member defining a top planar surface that extends at an angle relative to the base member; and a barb carried by the first member and extending into the cap engaging void, wherein the barb extends above a portion of the top planar surface of the intermediate retaining member.

2. The eyeglasses holder according to claim 1, wherein the first member defines a flanged portion on a second end that extends towards the cap engaging void for engaging the cap.

3. The eyeglasses holder according to claim 1, wherein the second member defines a first portion and a second portion in which the first portion extends from the base towards the intermediate member and the second portion extends from the first portion away from the intermediate member.

4. The eyeglasses holder according to claim 3, wherein the second portion of the second retaining member extends to a position that does not extend beyond a perimeter of the base.

5. The eyeglasses holder according to claim 1, wherein the intermediate member further includes a barb extending towards the cap engaging void.

6. The eyeglasses holder according to claim 1, wherein a lateral dimension of the cap engaging void is smaller than a lateral dimension of the eyeglasses engaging void.

7. The eyeglasses holder according to claim 1, wherein the first member extends longitudinally beyond the second member.

8. The eyeglasses holder according to claim 1, wherein the second member extends longitudinally beyond the intermediate member.

9. The eyeglasses holder according to claim 1, wherein the second member defines a surface area that is larger than a surface area of the intermediate member and the second member is positioned relative to the intermediate member so as to restrict viewing of the intermediate member.

10. The eyeglasses holder according to claim 1, wherein the second portion of the second retaining member defines a side planar surface interconnecting the base and a lowermost portion of the top planar surface, and further wherein the side planar surface extends at an angle relative to the base towards the top planar surface to thereby form a shape that generally corresponds to the shape of an ear support of a frame of the eyeglasses.

\* \* \* \* \*